United States Patent
Li et al.

(10) Patent No.: US 12,058,684 B2
(45) Date of Patent: Aug. 6, 2024

(54) RESOURCE CONFIGURATION METHOD, RESOURCE DETERMINING METHOD, NETWORK SIDE DEVICE AND TERMINAL

(71) Applicant: VIVO MOBILE COMMUNICATION CO., LTD., Guangdong (CN)

(72) Inventors: Na Li, Guangdong (CN); Xiaodong Shen, Guangdong (CN); Zhi Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 401 days.

(21) Appl. No.: 17/486,024

(22) Filed: Sep. 27, 2021

(65) Prior Publication Data

US 2022/0015091 A1 Jan. 13, 2022

Related U.S. Application Data

(63) Continuation of application No. PCT/CN2020/081022, filed on Mar. 25, 2020.

(30) Foreign Application Priority Data

Mar. 27, 2019 (CN) .......................... 201910240042.5

(51) Int. Cl.
*H04W 72/21* (2023.01)
*H04L 1/1812* (2023.01)

(52) U.S. Cl.
CPC ........... *H04W 72/21* (2023.01); *H04L 1/1812* (2013.01)

(58) Field of Classification Search
CPC . H04W 72/21; H04W 72/0453; H04W 72/00; H04W 72/56; H04L 1/1812; H04L 1/1861; H04L 5/0055; H04L 1/1854
See application file for complete search history.

(56) References Cited

U.S. PATENT DOCUMENTS

| | | | |
|---|---|---|---|
| 2017/0273056 | A1 | 9/2017 | Papasakellariou |
| 2018/0242286 | A1* | 8/2018 | Song ..................... H04L 1/0072 |
| 2019/0363840 | A1 | 11/2019 | Wang et al. |
| 2021/0329682 | A1* | 10/2021 | Takeda ............... H04W 72/0446 |
| 2022/0116156 | A1* | 4/2022 | Takeda .................. H04L 1/1861 |

FOREIGN PATENT DOCUMENTS

| | | |
|---|---|---|
| CN | 108289015 A | 7/2018 |
| CN | 109075914 A | 12/2018 |
| CN | 109076559 A | 12/2018 |

(Continued)

OTHER PUBLICATIONS

OPPO, "Summary of offline discussion on UCI enhancements for URLLC", 3GPP TSG RAN WG1 #96, R1-1903605, Athens, Greece, Feb. 25-Mar. 1, 2019.

(Continued)

*Primary Examiner* — Mohamed A Kamara
(74) *Attorney, Agent, or Firm* — Price Heneveld, LLP

(57) ABSTRACT

The present disclosure provides a resource configuration method, a resource determining method, a network side device, and a terminal. The resource configuration method includes: respectively configuring physical uplink control channel PUCCH resources for N hybrid automatic repeat request acknowledgement codebook HARQ-ACK codebooks, where N is an integer greater than 1.

12 Claims, 3 Drawing Sheets

(56) References Cited

FOREIGN PATENT DOCUMENTS

WO     2017030489 A1     2/2017
WO     2018128474 A1     7/2018

OTHER PUBLICATIONS

ZTE, "UL control enhancements for URLLC", 3GPP TSG RAN WG1 #96, R1-1901768, Athens, Greece, Feb. 25-Mar. 1, 2019.
OPPO, "Summary of offline discussion on UCI enhancements for URLLC", 3GPP TSG RAN WG1 #96, R1-1903431, Athens, Greece, Feb. 25-Mar. 1, 2019.

* cited by examiner

RESOURCE CONFIGURATION METHOD, RESOURCE DETERMINING METHOD, NETWORK SIDE DEVICE AND TERMINAL

CROSS-REFERENCE TO RELATED APPLICATIONS

This application is a continuation application of International Application No. PCT/CN2020/081022 filed on Mar. 25, 2020, which claims priority to Chinese Patent Application No. 201910240042.5 filed in China on Mar. 27, 2019, which are incorporated herein by reference in their entireties.

TECHNICAL FIELD

The present disclosure relates to the field of communications technologies, and in particular, to a resource configuration method, resource determining method, network side device and terminal.

BACKGROUND

In a future 5G communications system, there will be scenarios in which a plurality of services concurrently exist. For example, a user is both performing high-speed download of enhanced mobile broadband (eMBB) and receiving a low-latency service of ultra-reliable and low latency communications (URLLC). A future communication terminal can support different types of services (or referred to as "service types"). Because different service types have different requirements on latencies, reliability, and the like, a configuration manner of a physical uplink control channel (PUCCH) resource for transmitting a hybrid automatic repeat request acknowledgement codebook (HARQ-ACK codebook) in the related art cannot meet requirements of different service types, which affects communication performance.

SUMMARY

Embodiments of the present disclosure provide a resource configuration method, resource determining method, network side device and terminal, to solve a problem that a configuration manner of a PUCCH resource for transmitting a HARQ-ACK codebook in the related art cannot meet requirements of different service types.

To solve the foregoing problem, the present disclosure is implemented as follows.

According to a first aspect, an embodiment of the present disclosure provides a resource configuration method, applied to a network side device. The method includes:
  respectively configuring physical uplink control channel PUCCH resources for N HARQ-ACK codebooks, where
  N is an integer greater than 1.

According to a second aspect, an embodiment of the present disclosure provides a resource determining method, applied to a terminal, and the method includes:
  determining a correspondence between a hybrid automatic repeat request acknowledgement codebook HARQ-ACK codebook and a physical uplink control channel PUCCH resource configuration based on configuration information of a network side device; and
  determining a corresponding PUCCH resource for each HARQ-ACK codebook in N HARQ-ACK codebooks based on the correspondence, where
  N is an integer greater than 1.

According to a third aspect, an embodiment of the present disclosure further provides a network side device, including:
  a configuration module, configured to configure physical uplink control channel PUCCH resources for N HARQ-ACK codebooks, where
  N is an integer greater than 1.

According to a fourth aspect, an embodiment of the present disclosure provides a terminal, including:
  a first determining module, configured to determine a correspondence between a hybrid automatic repeat request acknowledgement codebook HARQ-ACK codebook and a physical uplink control channel PUCCH resource configuration based on configuration information of a network side device; and
  a second determining module, configured to determine a corresponding PUCCH resource for each HARQ-ACK codebook in N HARQ-ACK codebooks based on the correspondence, where
  N is an integer greater than 1.

According to a fifth aspect, an embodiment of the present disclosure provides a network side device, including a memory, a processor, and a computer program stored in the memory and executable on the processor. When the computer program is executed by the processor, the steps of the resource configuration method provided in the first aspect of the embodiments of the present disclosure are implemented.

According to a sixth aspect, an embodiment of the present disclosure provides a terminal, including a memory, a processor, and a computer program stored in the memory and executable on the processor. When the computer program is executed by the processor, the steps of the resource determining method provided in the second aspect of the embodiments of the present disclosure are implemented.

According to a seventh aspect, an embodiment of the present disclosure provides a computer-readable storage medium. The computer-readable storage medium stores a computer program. When the computer program is executed by a processor, the steps of the resource configuration method provided in the first aspect of the embodiments of the present disclosure are implemented, or the steps of the resource determining method provided in the second aspect of the embodiments of the present disclosure are implemented.

In the embodiments of the present disclosure, the network side device may respectively configure PUCCH resources for a plurality of HARQ-ACK codebooks, and different HARQ-ACK codebooks may correspond to different service types or different priorities. Therefore, the PUCCH resources can better meet different requirements of different service types or different priorities, thereby improving communications system performance.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

The term "include" and any of its other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The following describes the embodiments of the present disclosure with reference to the accompanying drawings. A resource configuration method provided in embodiments of the present disclosure may be applied to a wireless communications system. The wireless communications system may be a 5G system, an evolved long term evolution (eLTE) system, or a subsequent evolved communications system.

Figure 1:
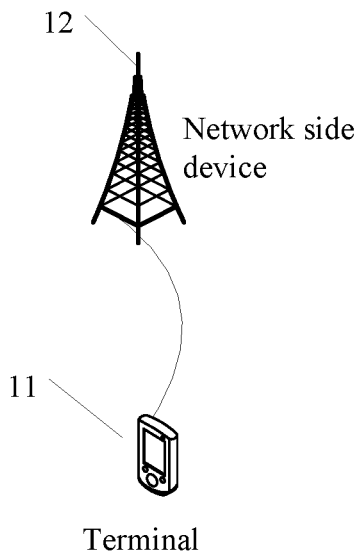
FIG. 1 is a diagram of a resource configuration system according to an embodiment of the present disclosure.

FIG. 1 is a structural diagram of a resource configuration system according to an embodiment of the present disclosure, and as shown in FIG. 1, a terminal 11 and a network side device 12 are included. The terminal 11 may be a mobile communications device, such as a mobile phone, a tablet personal computer, a laptop computer, a personal digital assistant (PDA), a mobile Internet device (MID), or a wearable device. It should be noted that a specific type of the terminal 11 is not limited in the embodiments of the present disclosure. The foregoing network side device 12 may be a 5G network side device (such as a gNB or a 5G NR NB), or may be a 4G network side device (such as eNB), or may be a 3G network side device (such as an NB), a network side device in a subsequent evolved communications system, or the like. It should be noted that a specific type of the network side device 12 is not limited in the embodiments of the present disclosure.

Before the technical solutions in the embodiments of the present disclosure are described in detail, technologies related to hybrid automatic repeat request acknowledgement (HARQ-ACK) transmission are briefly described.

To support services including ultra-reliable and low latency communications (URLLC), in a 5G communications system or a subsequent evolved communications system, a plurality of physical uplink control channels PUCCHs (PUCCH) used to feed back HARQ-ACKs will be supported to be transmitted in one time domain resource such as one slot. A same terminal may support different service types at the same time, and a same terminal may separately construct a plurality of HARQ-ACK codebooks (hybrid automatic repeat request acknowledgement codebook) at the same time to feed back downlink transmission of different services, including physical downlink shared channel (PDSCH) transmission and physical downlink control channel (PDCCH) transmission for semi-static PDSCH release. Each HARQ-ACK codebook may correspond to different service types.

Currently, different service types are not distinguished for transmission of HARQ-ACK codebooks, and HARQ-ACK codebooks are transmitted by using PUCCH resources with same configuration parameters.

However, because different service types have different requirements in terms of latency, reliability, and the like. This makes the foregoing PUCCH resource configuration manner inapplicable to different service types.

In view of this, embodiments of the present disclosure provide a resource configuration system shown in FIG. 1, and provide a resource configuration method applied to the resource configuration system, as follows:

A network side device respectively configures PUCCH resources for N HARQ-ACK codebooks.

The terminal determines a correspondence between a HARQ-ACK codebook and a PUCCH resource configuration based on configuration information of the network side device.

The terminal determines a corresponding PUCCH resource for each HARQ-ACK codebook in the N HARQ-ACK codebooks based on the correspondence.

N is an integer greater than 1.

In the foregoing N HARQ-ACK codebooks, different HARQ-ACK codebooks may correspond to different service types or different priorities. For example, for a terminal that supports both eMBB and URLLC, the terminal may separately construct corresponding HARQ-ACK codebooks for eMBB and URLLC downlink transmissions.

It should be noted that because different HARQ-ACK codebooks correspond to different service types or different priorities, in the embodiments of the present disclosure, "determining which HARQ-ACK codebook" may also be understood as "determining which service type/priority", and "a correspondence between a HARQ-ACK codebook and a PUCCH resource configuration" may also be understood as "a correspondence between a service type/priority and a PUCCH resource configuration".

In the embodiments of the present disclosure, the network side device may respectively configure PUCCH resources for a plurality of HARQ-ACK codebooks, and different HARQ-ACK codebooks may correspond to different service types or different priorities. Therefore, the PUCCH resources can better meet different requirements of different service types or different priorities, thereby improving communications system performance.

Figure 2:
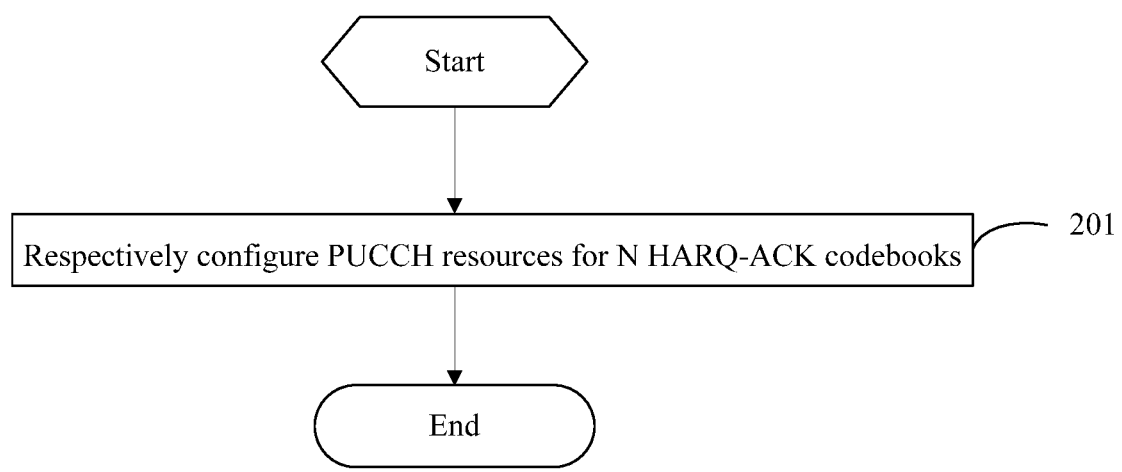
FIG. 2 is a flowchart of a resource configuration method according to an embodiment of the present disclosure.

FIG. 2 is a flowchart of a resource configuration method according to an embodiment of the present disclosure. As shown in FIG. 2, the resource configuration method is applied to a network side device, and the method includes the following step:

Step 201: Respectively configure PUCCH resources for N HARQ-ACK codebooks.

N is an integer greater than 1.

In the foregoing N HARQ-ACK codebooks, different HARQ-ACK codebooks may correspond to different service types or different priorities.

In this step, the network side device may configure, through radio resource control (RRC), the PUCCH resource used for feeding back or transmitting the HARQ-ACK codebook, and may determine, by using an RRC configuration or in a predefined manner, an association relationship between a HARQ-ACK codebook and a PUCCH resource, namely, indicating which PUCCH resource configuration is used for each HARQ-ACK codebook. Then the network side device determines, by using a high-layer/physical layer parameter, which HARQ-ACK codebook the current HARQ-ACK belongs to; determines a corresponding PUCCH resource configuration based on the relationship between a HARQ-ACK codebook and a PUCCH resource configuration; and then determines a corresponding PUCCH resource in the corresponding PUCCH resource configuration based on a UCI payload and a dynamic indication of a PUCCH resource indicator (PRI) field, that is, indicates which PUCCH resources are used by different HARQ-ACK codebooks.

In the foregoing process, the terminal determines, by using the high-layer or physical layer parameter in at least one of the following manners, which HARQ-ACK codebook the current HARQ-ACK belongs to: indication information in downlink control information (DCI), a control resource set (CORESET) or a search space in which the DCI is located, a corresponding DCI format, a corresponding radio network temporary identity (RNTI), and the like. It should be noted that a manner of determining a HARQ-ACK codebook/service type is not specifically limited herein.

It should be noted that because different HARQ-ACK codebooks may correspond to different service types or different priorities, in the embodiments of the present disclosure, "determining which HARQ-ACK codebook" may also be understood as "determining which service type/priority", and "a correspondence between a HARQ-ACK codebook and a PUCCH resource configuration" may also be understood as "a correspondence between a service type/priority and a PUCCH resource configuration".

In the foregoing PUCCH resource configuration, each PUCCH resource may be configured with parameters such as a start symbol, a length, and a physical resource block (PRB) quantity.

Because different service types have different requirements in terms of latencies, reliabilities, and the like, for downlink transmission of different service types, each HARQ-ACK codebook needs to be carried on a corresponding PUCCH resource for transmission. Therefore, the network side device can configure different parameters for PUCCH resources. For example, in order to meet an ultra-low latency requirement of a URLLC service, HARQ-ACKs can be fed back in one slot through a plurality of PUCCHs. A plurality of PUCCHs with different start symbols may be configured for one slot, and meanwhile, a dl-DataToUL-ACK (timing from downlink data to HARQ-ACK feedback) with a shorter PUCCH symbol length and a smaller time granularity may be configured. For another example, in order to meet reliability requirements of different services, different PUCCH-PowerControls (PUCCH power control) can be configured. For a same PUCCH format, different parameters such as PUCCH-MaxCodeRate (PUCCH maximum coding rate) and nrofSlots (number of slots) may be configured.

Specifically, the network side device may configure, by using IE PUCCH-Config, PUCCH resource related parameters, including resourceSetToAddModList (list for adding resource sets), resourceSetToReleaseList (list for releasing resource sets), multi-CSI-PUCCH-ResourceList (multi-CSI report PUCCH resource list), dl-DataToUL-ACK, format 1/2/3/4, and the like. resourceSetToAddModList may be configured with one or more PUCCH-resourceSet (PUCCH resource sets), each PUCCH-resourceSet corresponds to a specific range of an uplink control information payload (Uplink Control Information payload, UCI payload) that can be carried, and each PUCCH-resourceSet includes a plurality of PUCCH resources.

The terminal may determine, based on a quantity of UCI bits fed back by the network side device, a PUCCH resource set in a plurality of PUCCH resource sets configured through resourceSetToAddModList, and determine a PUCCH resource in the PUCCH resource set based on a PRI indicator, or determine a PUCCH resource in the PUCCH resource set based on a PRI and an index of the first CCE of a PDCCH; and then determine parameters such as maxCodeRate and nrofSlots based on the PUCCH resource, a corresponding start symbol, symbol length, PRB quantity, and PUCCH format, and a PUCCH format related parameter PUCCH-FormatConfig configured in PUCCH-config.

In this embodiment of the present disclosure, because the network side device configures a correspondence between a HARQ-ACK codebook and a PUCCH resource configuration, the terminal may determine the correspondence between a HARQ-ACK codebook and a PUCCH resource configuration based on configuration information of the network side device, and may separately determine a corresponding PUCCH resource for each HARQ-ACK codebook in N HARQ-ACK codebooks. Therefore, the terminal may separately use the corresponding PUCCH resource to implement feedback or transmission of each HARQ-ACK codebook, so that the PUCCH resources can better meet different requirements of different service types, thereby improving communications system performance.

A plurality of types of correspondences between HARQ-ACK codebooks and PUCCH resource configurations are described in detail below.

In an optional implementation, the respectively configuring PUCCH resources for N HARQ-ACK codebooks includes:

configuring M PUCCH-configs for the N HARQ-ACK codebooks, where the M PUCCH-configs represent M PUCCH configurations, each HARQ-ACK codebook in the N HARQ-ACK codebooks corresponds to one PUCCH-config, and M is less than or equal to N.

In this implementation, if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

In another optional implementation, the respectively configuring PUCCH resources for N HARQ-ACK codebooks includes:

configuring M PUCCH resource sets for the N HARQ-ACK codebooks, where each HARQ-ACK codebook in the N HARQ-ACK codebooks corresponds to one or more PUCCH resource sets.

In the foregoing N HARQ-ACK codebooks, different HARQ-ACK codebooks may respectively correspond to different PUCCH resource sets, which means a one-to-one correspondence. Alternatively, there may be different HARQ-ACK codebooks corresponding to a same PUCCH resource set, which means a many-to-one correspondence; or there may be a same HARQ-ACK codebook corresponding to a plurality of PUCCH resource sets, which means a one-to-many correspondence.

For example, there are two HARQ-ACK codebooks, and there are seven PUCCH resource sets: a PUCCH resource set 0, a PUCCH resource set 1, . . . , a PUCCH resource set 6. A correspondence between a HARQ-ACK codebook and a PUCCH resource set may be as follows:

A first HARQ-ACK codebook corresponds to the PUCCH resource set 0, the PUCCH resource set 1, the PUCCH resource set 2, and the PUCCH resource set 3.

A second HARQ-ACK codebook corresponds to the PUCCH resource set 3, the PUCCH resource set 4, the PUCCH resource set 5, and the PUCCH resource set 6.

Herein, the first HARQ-ACK codebook and the second HARQ-ACK codebook both correspond to the PUCCH resource set 3. In other words, different HARQ-ACK codebooks may correspond to a same PUCCH resource set.

In the foregoing example, the first HARQ-ACK codebook corresponds to four PUCCH resource sets, and the second HARQ-ACK codebook also corresponds to four PUCCH resource sets. In other words, a same HARQ-ACK codebook corresponds to a plurality of PUCCH resource sets.

In this implementation, configuring M PUCCH resource sets for the N HARQ-ACK codebooks may be implemented by configuring resource set lists for the N HARQ-ACK codebooks. There are two specific manners below of configuring resource set lists for the N HARQ-ACK codebooks.

Manner 1: The configuring M PUCCH resource sets for the N HARQ-ACK codebooks includes:
configuring P resource set lists for the N HARQ-ACK codebooks, where
the P resource set lists include M PUCCH resource sets, each HARQ-ACK codebook in the N HARQ-ACK codebooks corresponds to one resource set list, and P is less than or equal to N; and
if P is equal to N, the N HARQ-ACK codebooks have a one-to-one correspondence with the P resource set lists; or if P is less than N, a plurality of HARQ-ACK codebooks in the N HARQ-ACK codebooks correspond to a same resource set list.

Manner 2: The configuring M PUCCH resource sets for the N HARQ-ACK codebooks includes:
configuring a resource set list for the N HARQ-ACK codebooks, where
the resource set list includes M PUCCH resource sets, and each HARQ-ACK codebook in the N HARQ-ACK codebooks corresponds to one or more PUCCH resource sets.

In this implementation, for a plurality of HARQ-ACK codebooks, different configurations further need to be made for other PUCCH resource related parameters, such as PUCCH-FormatConfig, PUCCH-PowerControl, dl-DataToUL-ACK, PUCCH-MaxCodeRate for PUCCH format 2/3/4, and nrofSlots for PUCCH format 1/3/4.

In another optional implementation, the respectively configuring PUCCH resources for N HARQ-ACK codebooks includes:
configuring M PUCCH resources for the N HARQ-ACK codebooks, where
each HARQ-ACK codebook in the N HARQ-ACK codebooks corresponds to one or more resources.

In the foregoing N HARQ-ACK codebooks, different HARQ-ACK codebooks may respectively correspond to different PUCCH resources, which means a one-to-one correspondence. Alternatively, there may be different HARQ-ACK codebooks corresponding to a same PUCCH resource, which means a many-to-one correspondence; or there may be a same HARQ-ACK codebook corresponding to a plurality of PUCCH resources, which means a one-to-many correspondence.

For example, there are two HARQ-ACK codebooks, and there are seven PUCCH resources: a PUCCH resource 0, PUCCH resource 1, . . . , a PUCCH resource 6. A correspondence between a HARQ-ACK codebook and a PUCCH resource may be as follows:

A first HARQ-ACK codebook corresponds to the PUCCH resource 0, the PUCCH resource 1, the PUCCH resource 2, and the PUCCH resource 3.

A second HARQ-ACK codebook corresponds to the PUCCH resource 3, the PUCCH resource 4, the PUCCH resource 5, and the PUCCH resource 6.

Herein, the first HARQ-ACK codebook and the second HARQ-ACK codebook both correspond to the PUCCH resource 3. In other words, different HARQ-ACK codebooks may correspond to a same PUCCH resource.

In the foregoing example, the first HARQ-ACK codebook corresponds to four PUCCH resources, and the second HARQ-ACK codebook also corresponds to four PUCCH resources. In other words, a same HARQ-ACK codebook corresponds to a plurality of PUCCH resources.

In this implementation, configuring M PUCCH resource for the N HARQ-ACK codebooks may be implemented in different manners. There are specific manners below of configuring different resources for the N HARQ-ACK codebooks.

Manner 1: The configuration is made by using resourceList in IE PUCCH-ResourceSet. For example, for the N HARQ-ACK codebooks, N resourceLists may be configured in each configured PUCCH-ResourceSet, and each HARQ-ACK codebook corresponds to one resourceList.

Manner 2: The configuration is made by using resourceToAddModList/resourceToReleaseList in IE PUCCH-config. For example, for the N HARQ-ACK codebooks, N resourceToAddModLists/resourceToReleaseLists may be configured in PUCCH-config, and each HARQ-ACK codebook corresponds to one resourceToAddModList/resourceToReleaseList.

Manner 3: PUCCH resources for a plurality of HARQ-ACK codebooks are configured by using resourceList in IE PUCCH-ResourceSet. For example, for the N HARQ-ACK codebooks, one resourceList may be configured in each configured PUCCH-ResourceSet, and each HARQ-ACK codebook corresponds to a different resource in the resourceList.

In this implementation, for a plurality of HARQ-ACK codebooks, different configurations further need to be made for other PUCCH resource related parameters, such as PUCCH-FormatConfig, PUCCH-PowerControl, dl-DataToUL-ACK, PUCCH-MaxCodeRate for PUCCH format 2/3/4, and nrofSlots for PUCCH format 1/3/4.

According to the foregoing plurality of implementations, the network side device may respectively configure PUCCH resources for HARQ-ACK codebooks of different service types or different priorities. Therefore, the PUCCH resources can better meet different requirements of different service types or different priorities, thereby improving communications system performance.

Figure 3:
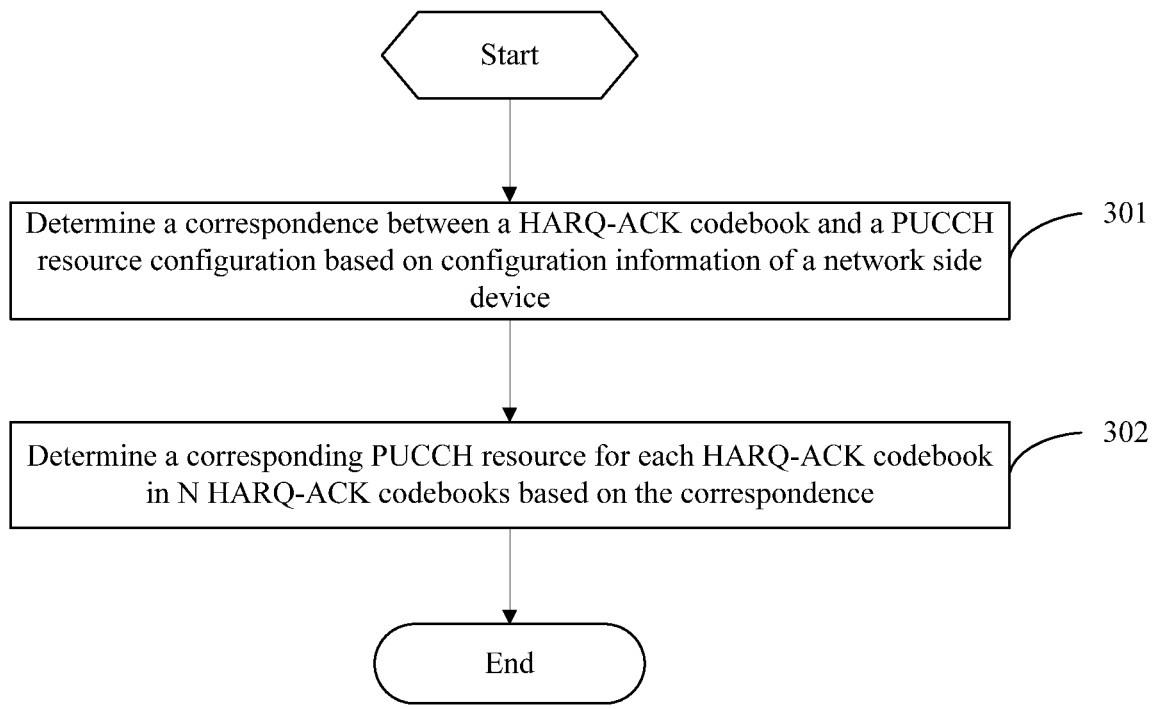
FIG. 3 is a flowchart of a resource determining method according to an embodiment of the present disclosure.

FIG. 3 is a flowchart of a resource determining method according to an embodiment of the present disclosure. As shown in FIG. 3, the resource determining method is applied to a terminal, and the method includes the following steps:

Step 301: Determine a correspondence between a HARQ-ACK codebook and a PUCCH resource configuration based on configuration information of a network side device.

Step 302: Determine a corresponding PUCCH resource for each HARQ-ACK codebook in N HARQ-ACK codebooks based on the correspondence.

N is an integer greater than 1.

In the foregoing N HARQ-ACK codebooks, different HARQ-ACK codebooks may correspond to different service types or different priorities.

In this embodiment of the present disclosure, the configuration information of the network side device may be RRC configuration information. The terminal may determine a HARQ-ACK codebook based on a high-layer or physical layer parameter, and then determine the corresponding PUCCH resource for each HARQ-ACK codebook in the N HARQ-ACK codebooks based on the correspondence between a HARQ-ACK codebook and a PUCCH resource configuration.

Optionally, the correspondence between a HARQ-ACK codebook and a PUCCH resource configuration includes at least one of the following:

each HARQ-ACK codebook corresponds to one PUCCH-config;

each HARQ-ACK codebook corresponds to one or more PUCCH resource sets;

each HARQ-ACK codebook corresponds to one resource set list; or each HARQ-ACK codebook corresponds to one or more resources.

It should be noted that this embodiment of the present disclosure serves as an embodiment of the terminal corresponding to the embodiment shown in FIG. 2. For specific implementations of this embodiment, reference may be made to related description of the embodiment shown in FIG. 2, and a same effect can be achieved. In order to avoid repeating the description, details are not described herein again.

To better understand the technical solutions in the embodiments of the present disclosure, the following describes the embodiments of the present disclosure with a plurality of examples.

Prerequisite: A terminal is configured with a plurality of HARQ-ACK codebooks. Different HARQ-ACK codebooks may correspond to different service types or different priorities.

Example 1: A network side device may configure a plurality of PUCCH-configs (PUCCH configurations) through RRC, and each HARQ-ACK codebook is associated with one PUCCH-config. A manner of mapping between a HARQ-ACK codebook and a PUCCH-config includes at least one of the following two manners:

one HARQ-ACK codebook is associated with one PUCCH-config, which means a one-to-one mapping (one-to-one mapping); or a plurality of HARQ-ACK codebooks are associated with a same PUCCH-config, which means a many-to-one mapping (many-to-one mapping).

The terminal may determine different HARQ-ACK codebooks by using physical layer indications or properties (When at least two HARQ-ACK codebooks are simultaneously constructed for supporting different service types for a UE, a HARQ-ACK codebook can be identified based on some PHY indications/properties). For example, the terminal may determine different HARQ-ACK codebooks by using an RNTI, a DCI format, a CORESET or search space, DCI, and the like.

Then, the terminal may determine, based on an association relationship between a HARQ-ACK codebook and a PUCCH-config, a PUCCH-config corresponding to each HARQ-ACK codebook, and select, based on a configuration of the PUCCH-config, a PUCCH resource set or PUCCH resource from PUCCH resource sets configured in the PUCCH-config.

In addition, the terminal may determine different-format configuration information of a PUCCH, such as parameters PUCCH-MaxCodeRate, nrofSlots, and PUCCH-PowerControl, based on PUCCH-FormatConfig (PUCCH format configuration file) configured in the PUCCH-config, and transmit the PUCCH.

For example, the network side device configures two PUCCH-configs through RRC.

```
PUCCH-Config-1 ::=     SEQUENCE {...}
PUCCH-Config-2 ::=     SEQUENCE {...}
or
PUCCH-ConfigList   SEQUENCE   (SIZE
  (1.. maxNrofPUCCH-configs)) OF
PUCCH-config
    PUCCH-Config ::= SEQUENCE {PUCCH-ConfigId
    PUCCH-ConfigId,}
```

The terminal may distinguish different HARQ-ACK codebooks, for example, two HARQ-ACK codebooks, by using a physical layer, where a HARQ-ACK codebook-1 is associated with a PUCCH-config-1, and a HARQ-ACK codebook-2 is associated with a PUCCH-config-2.

Example 2: Each HARQ-ACK codebook is associated with one PUCCH resource set, or each HARQ-ACK codebook is associated with a plurality of PUCCH resource sets. Herein, each HARQ-ACK codebook can be associated with a maximum of four PUCCH resource sets.

In a specific manner of this example, a network side device may configure a plurality of resource set lists through RRC. For example, the network side device configures resourceSetToAddModList or resourceSetToReleaseList through RRC. Herein, each resource set list may include a maximum of four PUCCH resource sets.

Each HARQ-ACK codebook may be associated with one resource set list, and a manner of mapping between a HARQ-ACK codebook and a resource set list includes at least one of the following two manners:

one HARQ-ACK codebook is associated with one resource set list, which means a one-to-one mapping (one-to-one mapping); or a plurality of HARQ-ACK codebooks are associated with a same resource set list, which means a many-to-one mapping (many-to-one mapping). In this case, different HARQ-ACK codebooks are allowed to be associated with a same resource set list.

For example, the network side device configures two resource set lists resourceSetToAddModList/resourceSetToReleaseList in a same PUCCH-Config through RRC.

```
PUCCH-Config ::=    SEQUENCE {
resourceSetToAddModList-1
SEQUENCE (SIZE (1.. maxNrofPUCCH-ResourceSets))
OF PUCCH-ResourceSet
resourceSetToReleaseList-1
SEQUENCE (SIZE (1.. maxNrofPUCCH-ResourceSets))
OF PUCCH-ResourceSetId
resourceSetToAddModList-2
SEQUENCE (SIZE (1.. maxNrofPUCCH-ResourceSets))
OF PUCCH-ResourceSet
resourceSetToReleaseList-2
SEQUENCE (SIZE (1.. maxNrofPUCCH-ResourceSets))
OF PUCCH-ResourceSetId
```

The terminal may distinguish different HARQ-ACK codebooks, for example, two HARQ-ACK codebooks, by using a physical layer, where a HARQ-ACK codebook-1 is associated with resourceSetToAddModList-1/resourceSetToReleaseList-1, and a HARQ-ACK codebook-2 is associated with resource SetToAddModList-2/resourceSetToReleaseList-2.

In another specific manner of this example, the network side device may also configure a resource set list through RRC, and a PUCCH-ResourceSet quantity included in the resource set list may be greater than 4. Each HARQ-ACK codebook may be associated with one or more PUCCH-ResourceSet. A manner of mapping between a HARQ-ACK codebook and a PUCCH-ResourceSet includes at least one of the following three types:

one HARQ-ACK codebook is associated with one PUCCH-ResourceSet, which means a one-to-one mapping (one-to-one mapping);

one HARQ-ACK codebook is associated with a plurality of PUCCH-ResourceSet, which means a one-to-many mapping (one-to-many mapping); or a plurality of HARQ-ACK codebooks are associated with a same PUCCH-ResourceSet, which means a many-to-one mapping (many-to-one mapping). In this case, different HARQ-ACK codebooks are allowed to be associated with a same PUCCH-ResourceSet.

For example, the network side device configures a resource set list resourceSetToAddModList/resourceSetToReleaseList in a same PUCCH-Config through RRC. The resource set list includes eight PUCCH-ResourceSets, whose PUCCH-ResourceSetIDs are 0, 1, 2, . . . , 7, respectively.

The terminal may distinguish different HARQ-ACK codebooks, for example, two HARQ-ACK codebooks, where a HARQ-ACK codebook-1 is associated with a PUCCH-ResourceSet 0, a PUCCH-ResourceSet 1, a PUCCH-ResourceSet 2, and a PUCCH-ResourceSet 3, and a HARQ-ACK codebook-2 is associated with a PUCCH-ResourceSet 4, a PUCCH-ResourceSet 5, a PUCCH-ResourceSet 6, and a PUCCH-ResourceSet 7.

For another example, the network side device configures a resource set list resourceSetToAddModList/resourceSetToReleaseList in a same PUCCH-Config through RRC. The resource set list includes six PUCCH-ResourceSets, whose PUCCH-ResourceSetIDs are 0, 1, 2, . . . , 5, 6, respectively.

The terminal may distinguish different HARQ-ACK codebooks, for example, two HARQ-ACK codebooks, by using a physical layer, where a HARQ-ACK codebook-1 is associated with a PUCCH-ResourceSet 0, a PUCCH-ResourceSet 1, PUCCH-ResourceSet 2, and a PUCCH-ResourceSet 3, and a HARQ-ACK codebook 2 is associated with the PUCCH-ResourceSet 3, a PUCCH-ResourceSet 4, and a PUCCH-ResourceSet 5.

Example 3: Each HARQ-ACK codebook corresponds to one or more PUCCH resources.

In a specific manner of this example, a network side device may configure a maximum of four PUCCH-ResourceSets for the terminal through RRC. Each PUCCH-ResourceSet includes a plurality of resourceLists (resource lists), and each HARQ-ACK codebook is associated with one resourceList in the PUCCH-ResourceSet.

For example:

```
PUCCH-ResourceSet ::= SEQUENCE {
PUCCH-ResourceSetId PUCCH-ResourceSetId,
resourceList-1
SEQUENCE (SIZE(1.. maxNrofPUCCH-ResourcesPerSet))
OF PUCCH-ResourceId,
resourceList-2
SEQUENCE (SIZE(1.. maxNrofPUCCH-ResourcesPerSet))
OF PUCCH-ResourceId,
maxPayloadMinus1    INTEGER (4...256) }
```

The terminal may distinguish different HARQ-ACK codebooks, for example, two HARQ-ACK codebooks, by using a physical layer, where a HARQ-ACK codebook-1 is associated with a resourceList-1 in the PUCCH-ResourceSet, and a HARQ-ACK codebook-2 is associated with a resourceList-2 in the PUCCH-ResourceSet. The terminal determines the PUCCH-ResourceSet by using a UCI payload, where there are two PUCCH resource lists in the PUCCH-ResourceSet. Then, the terminal determines a list from the resourceList-1 and the resourceList-2 based on the physical layer, and then determines a corresponding PUCCH resource from the determined list based on the PRI indicator, as shown in Table 1.

```
PUCCH-Config ::=    SEQUENCE
resourceSetToAddModList
    SEQUENCE (SIZE (1.. maxNrofPUCCH-Resource Sets)) OF PUCCH-ResourceSet
resourceSetToReleaseList
    SEQUENCE (SIZE (1.. maxNrofPUCCH-ResourceSets))
    OF PUCCH-ResourceSetId
```

TABLE 1

| PRI | HARQ-ACK codebook-1 | HARQ-ACK codebook-2 |
| --- | --- | --- |
| 000 | First resource in resourceList-1 | First resource in resourceList-2 |
| 001 | Second resource in resourceList-1 | Second resource in resourceList-2 |
| ... | ... | ... |

In a specific manner of this example, the network side device may configure a plurality of resource set lists for the terminal through RRC, for example, a plurality of resourceSetToAddModLists/resourceSetToReleaseLists. Each resourceToAddModList/resourceToReleaseList is associated with one HARQ-ACK codebook.

For example:

```
PUCCH-Config ::=    SEQUENCE {
resourceToAddModList-1
SEQUENCE (SIZE (1.. maxNrofPUCCH-Resources))
OF PUCCH-Resource
resourceToReleaseList-1
SEQUENCE (SIZE (1.. maxNrofPUCCH-Resources))
OF PUCCH-ResourceId
resourceToAddModList-2
SEQUENCE (SIZE (1.. maxNrofPUCCH-Resources))
OF PUCCH-Resource
resourceToReleaseList-2
SEQUENCE (SIZE (1.. maxNrofPUCCH-Resources))
OF PUCCH-ResourceId
```

The terminal may distinguish different HARQ-ACK codebooks, for example, two HARQ-ACK codebooks, by using a physical layer, where a HARQ-ACK codebook-1 is associated with resourceToAddModList-1/resourceToReleaseList-1, and a HARQ-ACK codebook-2 is associated with resourceToAddModList-2/resourceToReleaseList-2.

Because a PUCCH-resource under each resourceToAddModList/resourceToReleaseList includes a PUCCH-ResourceId, each PUCCH-resource is associated with a HARQ-ACK codebook. A PUCCH-resource may be included in a plurality of resourceToAddModLists/resourceToReleaseLists, and therefore may be associated with a plurality of HARQ-ACK codebooks.

The terminal may determine a RESET based on the UCI payload, and determine a PUCCH resource based on a PRI. In this case, a HARQ-ACK corresponding to the PUCCH resource indicated by the PRI should be consistent with a currently transmitted HARQ-ACK codebook.

In another specific manner of this example, each PUCCH-Resource is associated with one HARQ-ACK code book.

For example, the network side device configures four PUCCH resource sets (a RESET 0, a RESET 1, a RESET 2, and a RESET 3) for the terminal, and each RESET includes a plurality of PUCCH resources, such as X+Y PUCCH resources (the RESET 0 may include more than 32 PUCCH resources, and the RESET 1, RESET 2, and RESET 3 may each include more than 8 PUCCH resources), where X resources are a subset 1, and Y resources are a subset 2. Each subset is associated with a specific HARQ-ACK codebook.

The terminal may distinguish different HARQ-ACK codebooks, for example, two HARQ-ACK codebooks, by using a physical layer, where a HARQ-ACK codebook-1 is associated with X resources (the subset 1) in a PUCCH-ResourceSet, and a HARQ-ACK codebook-2 is associated with Y resources (the subset 2) in the PUCCH-ResourceSet. To be specific, after the terminal determines the RESET based on the UCI payload, if the physical layer determines that the HARQ-ACK belongs to type 1, the PRI separately indicates a specific resource in the X resources in the RESET, as shown in Table 2.

TABLE 2

| PRI | HARQ-ACK codebook-1 | HARQ-ACK codebook-2 |
| --- | --- | --- |
| 000 | First resource in the X resources (the subset 1) | First resource in the Y resources (the subset 2) |
| 001 | Second resource in the X resources (the subset 1) | Second resource in the Y resources (the subset 2) |
| ... | ... | ... |

It can be learned from the foregoing embodiments of the present disclosure that, in this embodiment of the present disclosure, the network side device may respectively configure PUCCH resources for a plurality of HARQ-ACK codebooks, and different HARQ-ACK codebooks may correspond to different service types or different priorities. Therefore, the PUCCH resources can better meet different requirements of different service types or different priorities, thereby improving communications system performance.

Figure 4:
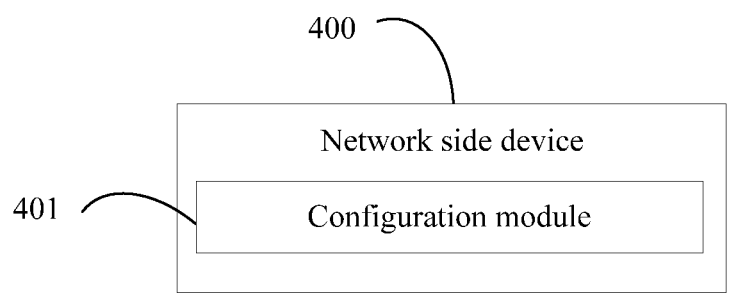
FIG. 4 is a structural diagram of a network side device according to an embodiment of the present disclosure.

FIG. 4 is a structural diagram of a network side device according to an embodiment of the present disclosure. As shown in FIG. 4, the network side device 400 includes:

a configuration module 401, configured to configure physical uplink control channel PUCCH resources for N HARQ-ACK codebooks, where N is an integer greater than 1.

Optionally, the configuration module 401 is specifically configured to:

configure M PUCCH-configs for the N HARQ-ACK codebooks, where the M PUCCH-configs represent M PUCCH configurations, each HARQ-ACK codebook in the N HARQ-ACK codebooks corresponds to one PUCCH-config, and M is less than or equal to N; and if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

Optionally, the configuration module 401 is specifically configured to:

configure M PUCCH resource sets for the N HARQ-ACK codebooks, where each HARQ-ACK codebook in the N HARQ-ACK codebooks corresponds to one or more PUCCH resource sets.

Optionally, the configuration module 401 is specifically configured to: configure P resource set lists for the N HARQ-ACK codebooks, where the P resource set lists include M PUCCH resource sets, each HARQ-ACK codebook in the N HARQ-ACK codebooks corresponds to one resource set list, and P is less than or equal to N; and if P is equal to N, the N HARQ-ACK codebooks have a one-to-one correspondence with the P resource set lists; or if P is less than N, a plurality of HARQ-ACK codebooks in the N HARQ-ACK codebooks correspond to a same resource set list.

Optionally, the configuration module 401 is specifically configured to:

configure a resource set list for the N HARQ-ACK codebooks, where the resource set list includes M PUCCH resource sets, and each HARQ-ACK codebook in the N HARQ-ACK codebooks corresponds to one or more PUCCH resource sets.

Optionally, the configuration module 401 is specifically configured to:
configure M PUCCH resources for the N HARQ-ACK codebooks, where
each HARQ-ACK codebook in the N HARQ-ACK codebooks corresponds to one or more resources.

It should be noted that the network side device 400 in this embodiment of the present disclosure may be a network side device in any implementation in the method embodiment, and any implementation of the network side device in the method embodiment may be implemented by the network side device 400 in this embodiment of the present disclosure, with a same beneficial effect achieved. To avoid repetition, details are not described herein again.

Figure 5:
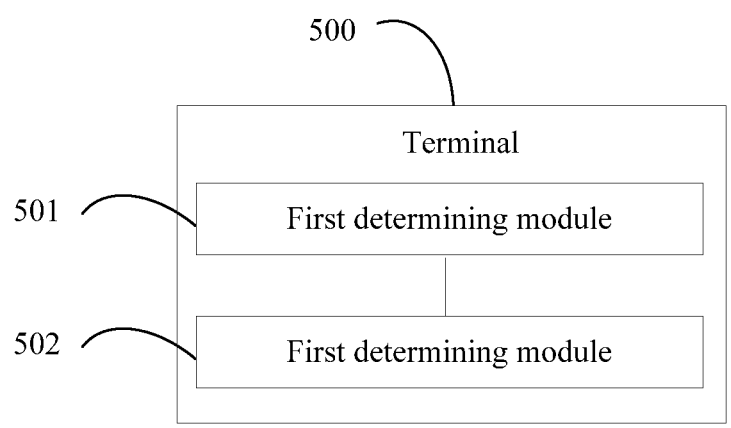
FIG. 5 is a structural diagram of a terminal according to an embodiment of the present disclosure.

FIG. 5 is a structural diagram of a terminal according to an embodiment of the present disclosure. As shown in FIG. 5, the terminal 500 includes:
a first determining module 501, configured to determine a correspondence between a hybrid automatic repeat request acknowledgement codebook HARQ-ACK codebook and a physical uplink control channel PUCCH resource configuration based on configuration information of a network side device; and
a second determining module 502, configured to determine a corresponding PUCCH resource for each HARQ-ACK codebook in N HARQ-ACK codebooks based on the correspondence, where
N is an integer greater than 1.

Optionally, the correspondence between a HARQ-ACK codebook and a PUCCH resource configuration includes at least one of the following:
each HARQ-ACK codebook corresponds to one PUCCH-config;
each HARQ-ACK codebook corresponds to one or more PUCCH resource sets;
each HARQ-ACK codebook corresponds to one resource set list; or
each HARQ-ACK codebook corresponds to one or more resources.

It should be noted that the terminal 500 in this embodiment of the present disclosure may be a terminal in any implementation in the method embodiments. Any implementation of the terminal in the method embodiments may be implemented by the terminal 500 in this embodiment of the present disclosure, and a same beneficial effect is achieved. To avoid repetition, details are not described herein again.

Figure 6:
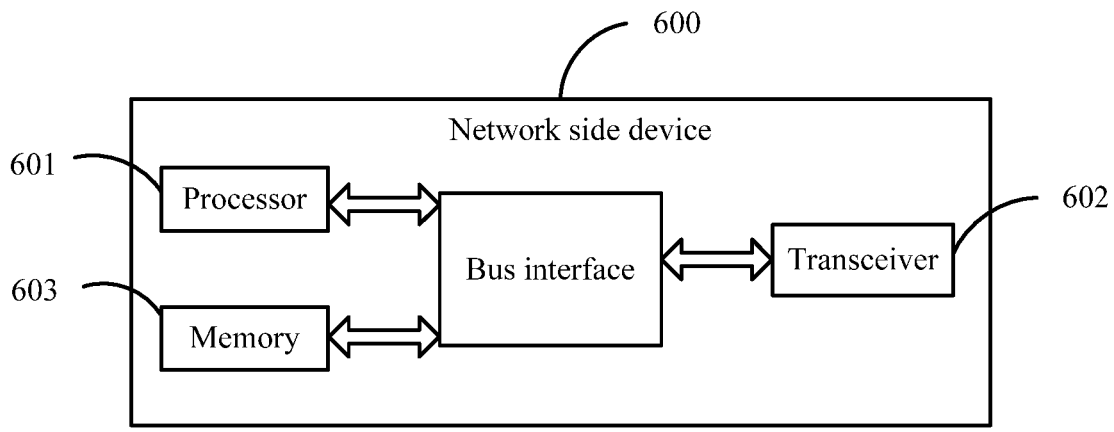
FIG. 6 is a structural diagram of another network side device according to an embodiment of the present disclosure.

FIG. 6 is a structural diagram of another network side device according to an embodiment of the present disclosure. As shown in FIG. 6, the network side device 600 includes a processor 601, a transceiver 602, a memory 603, and a bus interface.

The processor 601 or the transceiver 602 is configured to:
respectively configure physical uplink control channel PUCCH resources for N hybrid automatic repeat request acknowledgement codebook HARQ-ACK codebooks, where
N is an integer greater than 1.

Optionally, when performing the step of respectively configuring PUCCH resources for the N HARQ-ACK codebooks, the processor 601 or the transceiver 602 is configured to:
configure M PUCCH-configs for the N HARQ-ACK codebooks, where the M PUCCH-configs represent M PUCCH configurations, each HARQ-ACK codebook in the N HARQ-ACK codebooks corresponds to one PUCCH-config, and M is less than or equal to N; and
if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

Optionally, when performing the step of respectively configuring PUCCH resources for the N HARQ-ACK codebooks, the processor 601 or the transceiver 602 is configured to:
configure M PUCCH resource sets for the N HARQ-ACK codebooks, where
each HARQ-ACK codebook in the N HARQ-ACK codebooks corresponds to one or more PUCCH resource sets.

Optionally, when performing the step of configuring M PUCCH resource sets for the N HARQ-ACK codebooks, the processor 601 or the transceiver 602 is configured to:
configure P resource set lists for the N HARQ-ACK codebooks, where
the P resource set lists include M PUCCH resource sets, each HARQ-ACK codebook in the N HARQ-ACK codebooks corresponds to one resource set list, and P is less than or equal to N; and
if P is equal to N, the N HARQ-ACK codebooks have a one-to-one correspondence with the P resource set lists; or if P is less than N, a plurality of HARQ-ACK codebooks in the N HARQ-ACK codebooks correspond to a same resource set list.

Optionally, when performing the step of configuring M PUCCH resource sets for the N HARQ-ACK codebooks, the processor 601 or the transceiver 602 is configured to:
configure a resource set list for the N HARQ-ACK codebooks, where
the resource set list includes M PUCCH resource sets, and each HARQ-ACK codebook in the N HARQ-ACK codebooks corresponds to one or more PUCCH resource sets.

Optionally, when performing the step of respectively configuring PUCCH resources for the N HARQ-ACK codebooks, the processor 601 or the transceiver 602 is configured to:
configure M PUCCH resources for the N HARQ-ACK codebooks, where
each HARQ-ACK codebook in the N HARQ-ACK codebooks corresponds to one or more resources.

In FIG. 6, a bus architecture may include any quantity of interconnected buses and bridges, which are specifically connected together by various circuits of one or more processors represented by the processor 601 and a memory represented by the memory 603. The bus architecture may further connect various other circuits such as peripheral devices, voltage regulators, and power management circuits, which are all known in the art, and therefore, no further description is given herein. The bus interface provides an interface. The transceiver 602 may be a plurality of elements, including a transmitter and a receiver, and provides a unit on a transmission medium for communicating with various other devices. For different terminals, the user interface 604 may also be an interface capable of connecting externally and internally to a required device. The connected device includes but is not limited to a keypad, a display, a speaker, a microphone, a joystick, and the like.

The processor 601 is responsible for managing the bus architecture and common processing, and the memory 603 may store data used when the processor 601 performs an operation.

It should be noted that the network side device 600 in this embodiment may be a network side device in any implementation in the method embodiments in the embodiments of the present disclosure. Any implementation of the network side device in the method embodiments in the embodiments of the present disclosure may be implemented by the network side device 600 in this embodiment, and a same beneficial effect is achieved. To avoid repetition, details are not described herein again.

Figure 7:
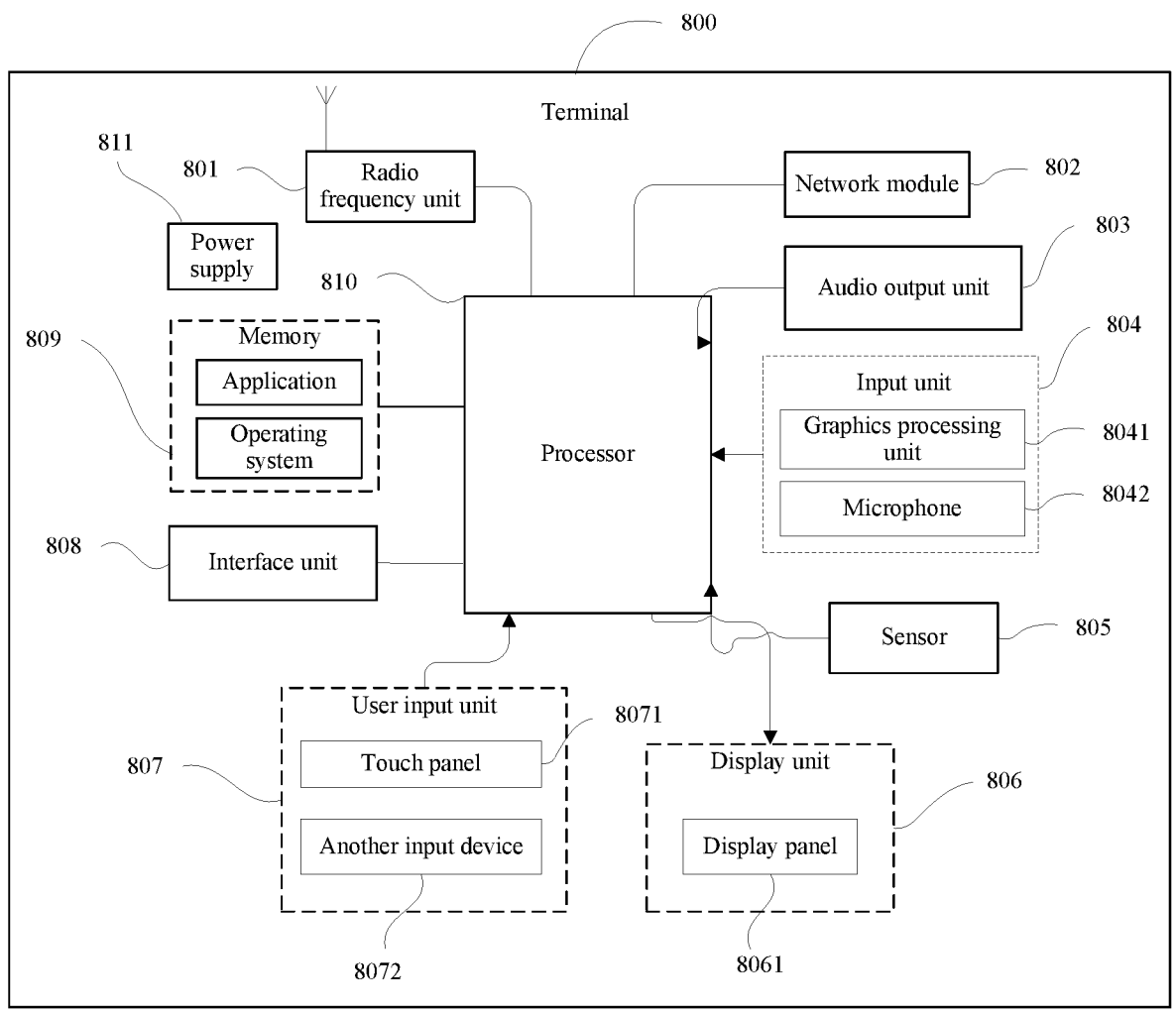
FIG. 7 is a schematic hardware structure diagram of another terminal according to an embodiment of the present disclosure.

FIG. 7 is a schematic diagram of a hardware structure of a terminal implementing embodiments of the present disclosure. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes but is not limited to, a mobile phone, a tablet computer, a notebook computer, a palmtop computer, a vehicle-mounted terminal, a wearable device, a pedometer, or the like.

The processor 810 is configured to:
determine a correspondence between a hybrid automatic repeat request acknowledgement codebook HARQ-ACK codebook and a physical uplink control channel PUCCH resource configuration based on configuration information of a network side device; and
determine a corresponding PUCCH resource for each HARQ-ACK codebook in N HARQ-ACK codebooks based on the correspondence, where
N is an integer greater than 1.

Optionally, the correspondence between a HARQ-ACK codebook and a PUCCH resource configuration includes at least one of the following:
each HARQ-ACK codebook corresponds to one PUCCH-config;
each HARQ-ACK codebook corresponds to one or more PUCCH resource sets;
each HARQ-ACK codebook corresponds to one resource set list; or
each HARQ-ACK codebook corresponds to one or more resources.

In the embodiments of the present disclosure, the network side device may respectively configure PUCCH resources for a plurality of HARQ-ACK codebooks, and different HARQ-ACK codebooks may correspond to different service types or different priorities. Therefore, the PUCCH resources determined by the terminal can better meet different requirements of different service types or different priorities, thereby improving communications system performance.

It should be understood that in this embodiment of the present disclosure, the radio frequency unit 801 may be configured to receive and transmit information, or receive and transmit a signal during a call. Specifically, the radio frequency unit 801 receives downlink data from a base station, and then transmits the downlink data to the processor 810 for processing; and in addition, transmits uplink data to the base station. Usually, the radio frequency unit 801 includes but is not limited to: an antenna, at least one amplifier, a transceiver, a coupler, a low noise amplifier, a duplexer, and the like. In addition, the radio frequency unit 801 may communicate with a network and another device through a wireless communications system.

The terminal provides a user with wireless broadband internet access by using the network module 802, for example, helping the user receive and send an email, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received sound, or a message received sound) related to a specific function implemented by the terminal 800. The audio output unit 803 includes a loudspeaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data of a static picture or video obtained by an image capture apparatus (such as a camera) in a video capture mode or an image capture mode. A processed image frame can be displayed on the display unit 806. An image frame processed by the graphics processing unit 8041 may be stored in the memory 809 (or another storage medium) or sent via the radio frequency unit 801 or the network module 802. The microphone 8042 can receive sound, and can process such sound into audio data. Processed audio data may be converted, in a telephone call mode, into a format that can be sent to a mobile communication base station via the radio frequency unit 801 for output.

The terminal 800 further includes at least one type of sensor 805, such as a light sensor, a motion sensor, and another sensor. Specifically, the optional sensor includes an ambient light sensor and a proximity sensor. The ambient light sensor may adjust luminance of the display panel 8061 based on brightness of ambient light, and the proximity sensor may disable the display panel 8061 and backlight when the terminal 800 approaches an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by the user or information provided for the user. The display unit 806 may include the display panel 8061, and the display panel 8061 may be configured in a form of a liquid crystal display (LCD), an organic light-emitting diode (OLED), or the like.

The user input unit 807 may be configured to receive input digit or character information and generate key signal input related to a user setting and function control of the terminal. Specifically, the user input unit 807 includes a touch panel 8071 and another input device 8072. The touch panel 8071 is further referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 810; and receives and executes a command sent by the processor 810. In addition, the touch panel 8071 may be implemented as a resistive type, a capacitive type, an infrared type, a surface acoustic wave type, or the like. The user input unit 807 may further include the another input device 8072 in addition to the touch panel 8071. Specifically, the another input device 8072 may include but is not limited to a physical keyboard, a function button (such as a volume control button or a power on/off button), a trackball, a mouse, a joystick, and the like. Details are not described herein.

Further, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 7, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface connecting an external apparatus and the terminal 800. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 808 may be configured to receive an input (for example, data information or power) from an external apparatus and transmit the received input to one or more elements in the terminal 800, or transmit data between the terminal 800 and the external apparatus.

The memory 809 may be configured to store a software program as well as various types of data. The memory 809 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 809 may include a high-speed random access memory, and may further include a non-volatile memory such as at least one magnetic disk storage device, a flash memory device, or another volatile solid-state storage device.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 can include one or more processing units. Preferably, the processor 810 can be integrated with an application processor and a modem processor. The application processor mainly processes the operating system, the user interface, applications, etc. The modem processor mainly processes wireless communication. It can be understood that alternatively, the modem processor may not be integrated into the processor 810.

The terminal 800 may further include the power supply 811 (such as a battery) that supplies power to each component. Preferably, the power supply 811 may be logically connected to the processor 810 by using a power management system, so as to implement functions such as charging, discharging, and power consumption management by using the power management system.

In addition, the terminal 800 includes some function modules not shown, and details are not described herein.

Preferably, an embodiment of the present disclosure further provides a terminal, including a processor 810, a memory 809, a computer program stored in the memory 809 and executable on the processor 810. When the computer program is executed by the processor 810, processes of the foregoing resource determining method embodiment are implemented, and a same technical effect can be achieved. To avoid repetition, details are not described herein again.

It should be noted that the terminal 800 in this embodiment may be a terminal in any implementation in the method embodiment of the embodiments of the present disclosure. Any implementation of the terminal in the method embodiment of the embodiments of the present disclosure may be implemented by the terminal 800 in this embodiment, with a same beneficial effect achieved. Details are not described herein again.

An embodiment of the present disclosure further provides a computer-readable storage medium. The computer-readable storage medium stores a computer program. When the computer program is executed by a processor, processes of the foregoing resource configuration method embodiment corresponding to the terminal or the network side device are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . ", without more constraints, does not preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes instructions for enabling a terminal (which may be a mobile phone, a computer, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource configuration method, applied to a network side device, and comprising:
   respectively configuring physical uplink control channel (PUCCH) resources for N hybrid automatic repeat request acknowledgement codebook (HARQ-ACK) codebooks, wherein
   N is an integer greater than 1;
   wherein the respectively configuring PUCCH resources for N HARQ-ACK codebooks comprises:
   configuring M PUCCH-configs for the N HARQ-ACK codebooks, wherein
   the M PUCCH-configs represent M PUCCH configurations, each HARQ-ACK codebook in the N HARQ-ACK codebooks corresponds to one PUCCH-config, and M is less than or equal to N; and
   if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

2. The method according to claim 1, wherein the respectively configuring PUCCH resources for N HARQ-ACK codebooks further comprises:
   configuring M PUCCH resource sets for the N HARQ-ACK codebooks, wherein
   each HARQ-ACK codebook in the N HARQ-ACK codebooks corresponds to one or more PUCCH resource sets.

3. The method according to claim 2, wherein the configuring M PUCCH resource sets for the N HARQ-ACK codebooks comprises:
   configuring P resource set lists for the N HARQ-ACK codebooks, wherein
   the P resource set lists comprise M PUCCH resource sets, each HARQ-ACK codebook in the N HARQ-ACK codebooks corresponds to one resource set list, and P is less than or equal to N; and
   if P is equal to N, the N HARQ-ACK codebooks have a one-to-one correspondence with the P resource set lists; or if P is less than N, a plurality of HARQ-ACK codebooks in the N HARQ-ACK codebooks correspond to a same resource set list.

4. The method according to claim 2, wherein the configuring M PUCCH resource sets for the N HARQ-ACK codebooks comprises:
   configuring a resource set list for the N HARQ-ACK codebooks, wherein
   the resource set list comprises M PUCCH resource sets, and each HARQ-ACK codebook in the N HARQ-ACK codebooks corresponds to one or more PUCCH resource sets.

5. The method according to claim 1, wherein the respectively configuring PUCCH resources for N HARQ-ACK codebooks comprises:
   configuring M PUCCH resources for the N HARQ-ACK codebooks, wherein
   each HARQ-ACK codebook in the N HARQ-ACK codebooks corresponds to one or more resources.

6. A resource determining method, applied to a terminal, and comprising:
   determining a correspondence between a hybrid automatic repeat request acknowledgement codebook (HARQ-ACK) codebook and a physical uplink control channel (PUCCH) resource configuration based on configuration information of a network side device; and
   determining a corresponding PUCCH resource for each HARQ-ACK codebook in N HARQ-ACK codebooks based on the correspondence, wherein
   N is an integer greater than 1;
   wherein the correspondence between the HARQ-ACK codebook and the PUCCH resource configuration comprises:
   each HARQ-ACK codebook corresponds to one PUCCH-config;
   wherein M PUCCH-configs are configured for the N HARQ-ACK codebooks, the M PUCCH-configs represent M PUCCH configurations, and M is less than or equal to N; and
   if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

7. The method according to claim 6, wherein the correspondence between a HARQ-ACK codebook and a PUCCH resource configuration comprises at least one of the following:
   each HARQ-ACK codebook corresponds to one or more PUCCH resource sets;
   each HARQ-ACK codebook corresponds to one resource set list; or
   each HARQ-ACK codebook corresponds to one or more resources.

8. A network side device, comprising: a memory, a processor, and a computer program stored in the memory and executable on the processor, wherein the computer program, when executed by the processor, implements steps of the resource configuration method according to claim 1.

9. A terminal, comprising a memory, a processor, and a computer program stored in the memory and executable on the processor, wherein the computer program, when executed by the processor, implements:
   determining a correspondence between a hybrid automatic repeat request acknowledgement codebook (HARQ-ACK) codebook and a physical uplink control channel (PUCCH) resource configuration based on configuration information of a network side device; and
   determining a corresponding PUCCH resource for each HARQ-ACK codebook in N HARQ-ACK codebooks based on the correspondence, wherein
   N is an integer greater than 1;
   wherein the correspondence between the HARQ-ACK codebook and the PUCCH resource configuration comprises:
   each HARQ-ACK codebook corresponds to one PUCCH-config;

wherein M PUCCH-configs are configured for the N HARQ-ACK codebooks, the M PUCCH-configs represent M PUCCH configurations, and M is less than or equal to N; and if M is equal to N, the N HARQ-ACK codebooks have a one-to-one correspondence with the M PUCCH-configs; or if M is less than N, a plurality of HARQ-ACK codebooks in the N HARQ-ACK codebooks correspond to a same PUCCH-config.

10. The method according to claim 9, wherein the correspondence between a HARQ-ACK codebook and a PUCCH resource configuration comprises at least one of the following:

each HARQ-ACK codebook corresponds to one or more PUCCH resource sets;

each HARQ-ACK codebook corresponds to one resource set list; or each HARQ-ACK codebook corresponds to one or more resources.

11. A non-transitory computer-readable storage medium, wherein the computer-readable storage medium stores a computer program, wherein the computer program, when executed by a processor, implements steps of the resource determining method according to claim 6.

12. A non-transitory computer-readable storage medium, wherein the computer-readable storage medium stores a computer program, wherein the computer program, when executed by a processor, implements steps of the resource determining method according to claim 1.

* * * * *